United States Patent
Kennedy

(10) Patent No.: US 8,352,438 B1
(45) Date of Patent: Jan. 8, 2013

(54) SYSTEMS AND METHODS FOR CONTEXTUAL EVALUATION OF FILES FOR USE IN FILE RESTORATION

(75) Inventor: Mark Kennedy, Redondo Beach, CA (US)

(73) Assignee: Symantec Corporation, Mountain View, CA (US)

( * ) Notice: Subject to any disclaimer, the term of this patent is extended or adjusted under 35 U.S.C. 154(b) by 91 days.

(21) Appl. No.: 12/882,497

(22) Filed: Sep. 15, 2010

(51) Int. Cl.
  *G06F 7/00* (2006.01)
  *G06F 17/00* (2006.01)
(52) U.S. Cl. .......................................................... 707/674
(58) Field of Classification Search .................. 707/674, 707/999.202
  See application file for complete search history.

(56) References Cited

U.S. PATENT DOCUMENTS

| | | | |
|---|---|---|---|
| 2007/0100905 A1* | 5/2007 | Masters et al. | 707/201 |
| 2010/0262584 A1* | 10/2010 | Turbin et al. | 707/674 |
| 2011/0225128 A1* | 9/2011 | Jarrett et al. | 707/692 |

* cited by examiner

*Primary Examiner* — Aleksandr Kerzhner
(74) *Attorney, Agent, or Firm* — Advantedge Law Group

(57) ABSTRACT

A method for contextual evaluation of files for use in file restoration. The method may include receiving a request to replace a damaged file on a computing system with a clean instance of the damaged file and identifying a clean file that corresponds to the damaged file. The method may also include identifying at least one file set that includes the clean file. The method may further include evaluating the suitability of the clean file for use as a replacement for the damaged file by: 1) determining whether the computing system includes an instance of each file in the file set and 2) deciding, based on the determination of whether the computing system includes an instance of each file in the file set, whether to replace the damaged file with the clean file. Various other methods, systems, and computer-readable media are also disclosed.

20 Claims, 5 Drawing Sheets

SYSTEMS AND METHODS FOR CONTEXTUAL EVALUATION OF FILES FOR USE IN FILE RESTORATION

BACKGROUND

Malicious programmers often disseminate malware that injects malicious code into legitimate files on a user's computer. Such malicious code may be difficult to detect and remove. While it may sometimes be possible to remove an infection from a file, traditional anti-virus software generally cannot remove infections in a manner that returns an infected file to its original (i.e., same size and file hash) state.

As an alternative to attempting to clean a file, some anti-virus solutions may attempt to replace an infected file with a clean instance of the infected file. Such anti-virus solutions may attempt to locate a hash that was created of the infected file prior to infection. The anti-virus solution may then use the hash to identify a clean instance of the file and may replace the infected file with the identified clean file.

Unfortunately, the process for replacing infected files with clean files may result in the wrong version of a file (or even the wrong file) being used to replace an infected file. As a result, a software program and/or computer system that uses the replacement file may not function properly or may not function at all. Another problem with attempting to replace infected files with clean files is that some software publishers may not allow individual files to be downloaded to a user's system solely based on a hash of the individual file because the publishers cannot ensure that the user is legally entitled to use the file. What is needed, therefore, is a more effective mechanism for identifying files for use in file restoration.

SUMMARY

As will be described in greater detail below, the instant disclosure generally relates to systems and methods for contextual evaluation of files for use in file restoration. For example, a method for contextual evaluation of files for use in file restoration may include receiving a request to replace a damaged file (e.g., a file infected with malware) on a computing system with a clean instance of the damaged file and identifying a clean file that corresponds to the damaged file. The method may also include identifying at least one file set that includes the clean file. The file set may include one or more additional files that are expected to be present on a computer when the clean file is present on the computer. The method may further include evaluating the suitability of the clean file for use as a replacement for the damaged file by: 1) determining whether the computing system includes an instance of each file in the file set and 2) deciding, based on the determination of whether the computing system includes an instance of each file in the file set, whether to replace the damaged file with the clean file.

In some embodiments, identifying the clean file that corresponds to the damaged file may include matching a hash of the clean file to a hash of the damaged file, and determining whether the computing system includes an instance of each file in the file set may include determining whether a hash of each file in the file set matches a hash of a file on the computing system. Additionally or alternatively, determining whether the computing system includes an instance of each file in the file set may include determining that the computing system includes an instance of each file in the file set, and determining whether to replace the damaged file with the clean file may include determining to replace the damaged file with the clean file and then replacing the damaged file with the clean file.

According to various embodiments, determining whether the computing system includes an instance of each file in the file set may include determining that the computing system does not include an instance of each file in the file set, and determining whether to replace the damaged file with the clean file may include determining not to replace the damaged file with the clean file.

In at least one embodiment, the method may include determining whether the computing system has access rights to the damaged file. In such embodiments, determining whether the computing system has access rights to the damaged file includes determining whether the computing system includes an instance of each file in the file set. Additionally or alternatively the method may include determining whether the clean file is a correct file version for replacing the damaged file. In such embodiments, determining whether the clean file is the correct file version for replacing the damaged file includes determining whether the computing system includes an instance of each file in the file set.

According to various embodiments, the method may include receiving the file set from a publisher of the damaged file. In at least one embodiment, the file set may include a set of hashes and corresponding file names that identify a set of files. The file set may be a set of files included in a service pack for a software application, a set of files included in a patch for a software application, and/or any other suitable set of files.

In certain embodiments, a system for contextual evaluation of files for use in file restoration may include 1) a communication module programmed to receive a request to replace a damaged file on a computing system with a clean instance of the damaged file, 2) an identification module programmed to identify a clean file that corresponds to the damaged file and identify at least one file set that includes the clean file, the file set including one or more additional files that are expected to be present on a computer when the clean file is present on the computer, 3) an evaluation module programmed to evaluate the suitability of the clean file for use as a replacement for the damaged file by determining whether the computing system includes an instance of each file in the file set and deciding, based on the determination of whether the computing system includes an instance of each file in the file set, whether to replace the damaged file with the clean file, and 4) one or more processors configured to execute the communication module, the identification module, and the evaluation module.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
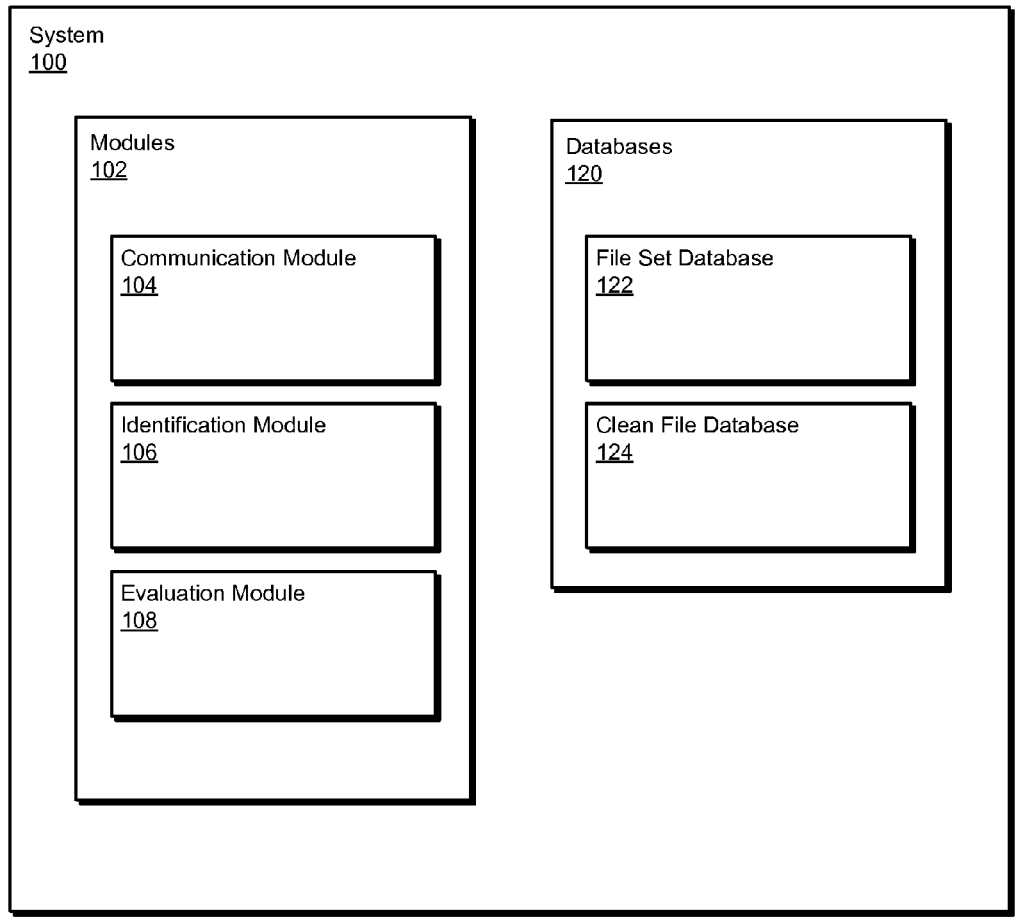
FIG. 1 is a block diagram of an exemplary system for contextual evaluation of files for use in file restoration.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for contextual evaluation of files for use in file restoration. For example, systems described herein may determine whether files related to an infected file are present on a computing system before replacing the infected file on the computing system. In this manner, systems disclosed herein may verify that a correct version of a file is being used to replace an infected file, may verify that a computing system is entitled to download a replacement file, and/or may provide various other advantages and features.

Figure 2:
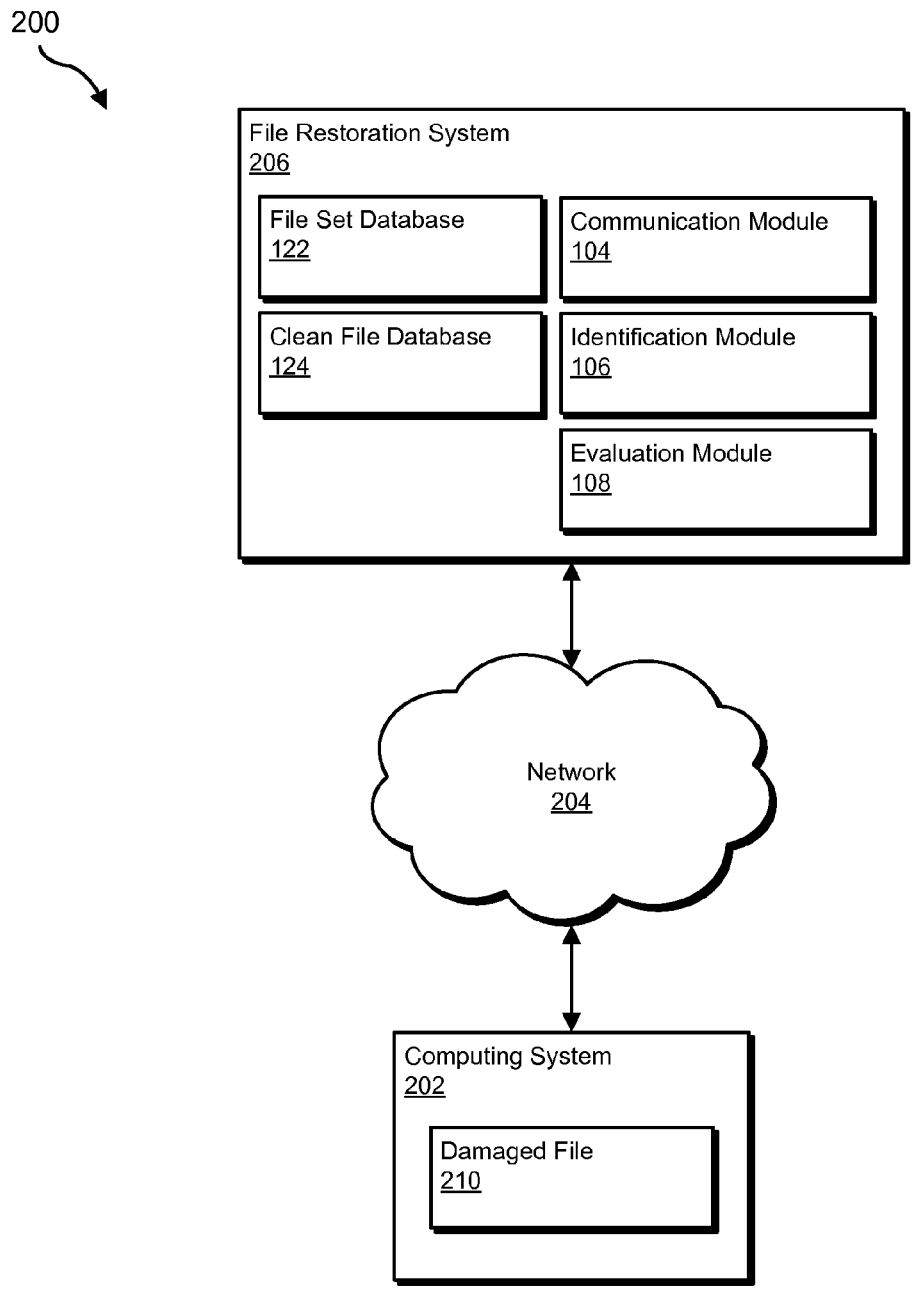
FIG. 2 is a block diagram of another exemplary system for contextual evaluation of files for use in file restoration.

The following will provide, with reference to FIGS. 1-2, detailed descriptions of exemplary systems for contextual evaluation of files for use in file restoration. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 4 and 5, respectively.

FIG. 1 is a block diagram of an exemplary system 100 for contextual evaluation of files for use in file restoration. As illustrated in this figure, exemplary system 100 may include one or more modules 102 for performing one or more tasks. For example, and as will be explained in greater detail below, exemplary system 100 may include a communication module 104 programmed to receive a request to replace a damaged file on a computing system with a clean instance of the damaged file. Exemplary system 100 may also include an identification module 106 programmed to identify a clean file that corresponds to the damaged file and identify at least one file set that includes the clean file (the file set may include one or more additional files that are expected to be present on a computer when the clean file is present on the computer).

In addition, and as will be described in greater detail below, exemplary system 100 may include an evaluation module 108 programmed to evaluate the suitability of the clean file for use as a replacement for the damaged file by 1) determining whether the computing system includes an instance of each file in the file set and 2) deciding, based on the determination of whether the computing system includes an instance of each file in the file set, whether to replace the damaged file with the clean file. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing system 202 and/or file restoration system 206), computing system 410 in FIG. 4, and/or portions of exemplary network architecture 500 in FIG. 5. One or more of modules 102 in FIG. 1 may also represent all or portions of one or more special-purpose computers configured to perform one or more tasks.

As illustrated in FIG. 1, exemplary system 100 may also include one or more databases 120. Databases 120 may represent portions of a single database or computing device or a plurality of databases or computing devices. In one embodiment, exemplary system 100 may include a file set database 122 for storing one or more set of files. File set database 122 may include file sets received from publishers, file sets created by file restoration system 206, and/or file sets identified in any other manner. File sets may be created by identifying and/or creating hashes for groups of files in patches, updates, applications, and/or any other file groups. Sets of files in file set database 122 may include the files themselves, hashes of files, names of files, and/or any other file identification information.

Exemplary system 100 may also include a clean file database 124 that includes and/or identifies one or more clean files. Clean file database 124 may include the clean files themselves, hashes of the clean files, names of clean files, and/or any other file identification information. In some embodiments, clean file database 124 may be part of file set database 122.

Databases 120 in FIG. 1 may represent a portion of one or more computing devices. For example, databases 120 may represent a portion of file restoration system 206 in FIG. 2, computing system 410 in FIG. 4, and/or portions of exemplary network architecture 500 in FIG. 5. Alternatively, databases 120 in FIG. 1 may represent one or more physically separate devices capable of being accessed by a computing device, such as file restoration system 206 in FIG. 2, computing system 410 in FIG. 4, and/or portions of exemplary network architecture 500 in FIG. 5.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include a computing system 202 in communication with a file restoration system 206 via a network 204. In one embodiment, and as will be described in greater detail below, computing device 202 may be include a damaged file 210. Computing system 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 410 in FIG. 4, or any other suitable computing device.

File restoration system 206 generally represents any type or form of computing device that is capable of restoring damaged files. File restoration system 206 may be configured to replace damaged file 210 on computing system 202 with a clean version of damaged file 210. Examples of file restoration system 206 include, without limitation, application servers and database servers configured to provide various database services and/or run certain software applications.

As previously noted, file restoration system 206 may communicate with computing system 202 over network 204. Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 500 in FIG. 5, or the like. Network 204 may facilitate communication or data transfer using wireless or wired connections.

While FIG. 2 shows file restoration system 206 remote from computing system 202, in some embodiments all or a portion of file restoration system 206 may be located on computing system 202. In some embodiments, file restoration system 206 may be a system of an anti-malware software publisher, and computing system 202 may be a computing system of a customer of the anti-malware software publisher.

Figure 3:
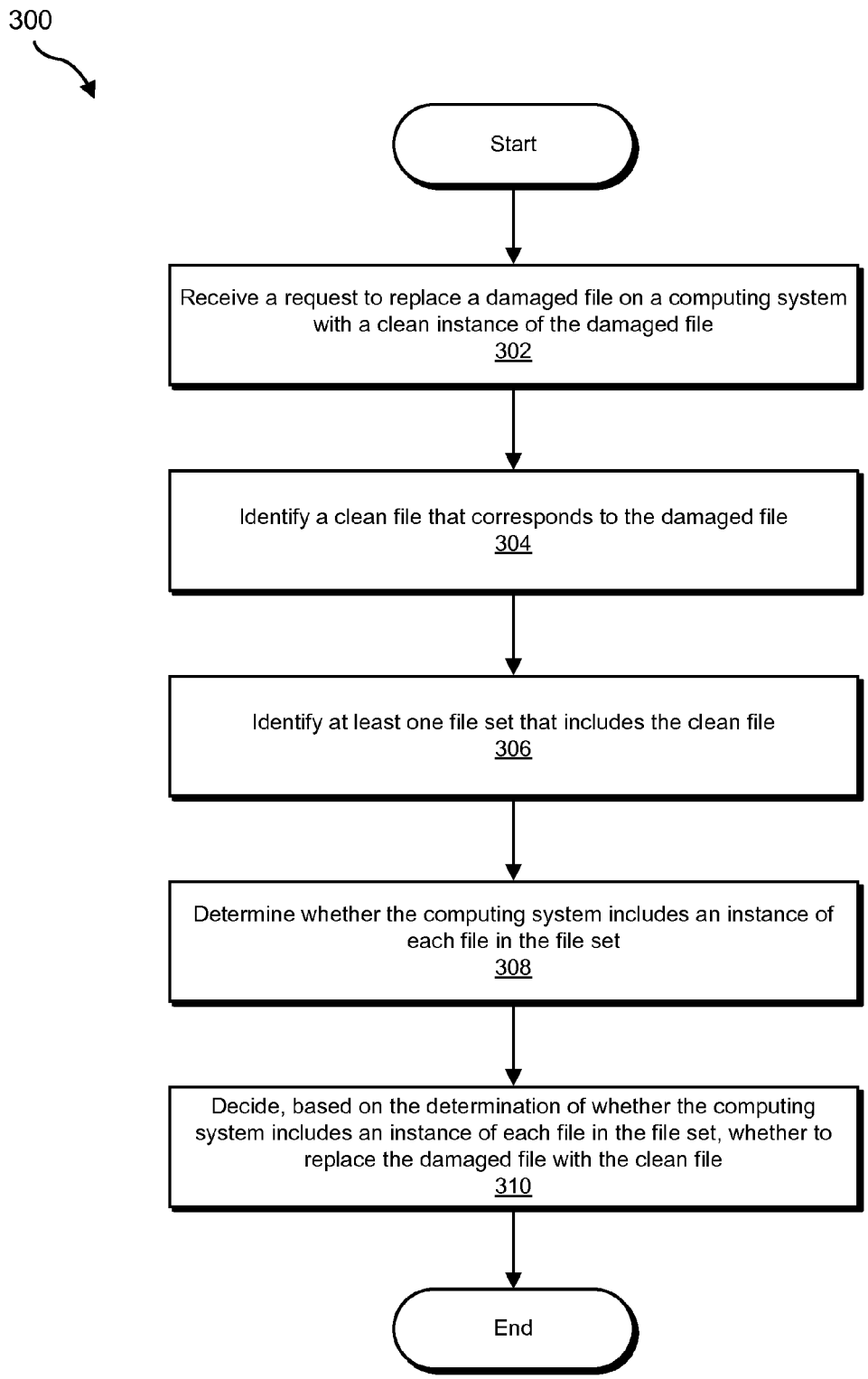
FIG. 3 is a flow diagram of an exemplary method for contextual evaluation of files for use in file restoration.

FIG. 3 is a flow diagram of an exemplary computer-implemented method 300 for contextual evaluation of files for use in file restoration. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

At step 302 in FIG. 3, one or more of the systems described herein may receive a request to replace a damaged file on a computing system with a clean instance of the damaged file. For example, communication module 104 may receive a request to replace damaged file 210 on computing system 202 with a clean instance of damaged file 210.

Communication module 104 may receive requests to replace damaged files in a variety of contexts. For example, damaged file 210 may be a file infected with malware, and communication module 104 may receive the request to replace damaged file 210 from an anti-malware software program. In such embodiments, communication module 104 may be a part of the anti-malware software program (e.g., an anti-virus software program). An anti-malware software program may locate damaged files, such as damaged file 210, as part of a malware scan and/or any other malware detection process.

In other embodiments, communication module 104 may receive a request to replace a file that is damaged by having been corrupted, and communication module 104 may receive a request to replace damaged file 210 as part of an attempt to restore damaged file 210 to a working state. Damaged file 210 may also be a file that has simply been modified, and as a result of the modification, a software application that uses damaged file 210 may not function as desired. In such situations, communication module 104 may receive a request to replace damaged file 210 as part of an attempt to provide the correct version for the damaged file and/or to restore the damaged file to a functional state.

As used herein, the phrase "damaged file" generally refers to any type or form of computer file (e.g., data file, executable file, dynamic-link-library file, etc.) that has been infected, corrupted, and/or modified in any way. As used herein, the phrases "clean file", and "clean instance of a file" generally refer to any type or form of computer file that is not infected with malware, is not corrupted, and/or has not been modified in a way that produces undesirable results. For example, a clean instance of a file may be an original instance of a file from a publisher.

At step 304 in FIG. 3, one or more of the systems described herein may identify a clean file that corresponds to the damaged file. For example, identification module 106 may identify a clean file in clean file database 124 that corresponds to damaged file 210. Identification module 106 may identify a clean file that corresponds to a damaged file in any suitable manner. In some embodiments, communication module 104 may match a hash of the damaged file to a hash of the clean file. For example, identification module 106 may identify a hash of damaged file 210 and may use that hash to search a list of hashes in clean file database 124 for a hash of a file that matches the hash of damaged file 210.

In some embodiments, when searching for a clean file that corresponds to the damaged file, identification module 106 may identify a hash of damaged file 210 created at a point in time before damaged file 210 was damaged (e.g., the most recent hash of damaged file 210 before it was damaged). As used herein, the term "hash" generally refers to any one-to-many representation of a computer file, including fingerprints, checksums, and/or any other type of file identifiers.

In some embodiments, identification module 106 may identify a clean file that corresponds to the damaged file by simply identifying a file with the same name as the damaged file. Additionally or alternatively, identification module 106 may identify the clean file that corresponds to the damaged file by identifying a file whose name and hash match a name and hash of the damaged file. Identification module 106 may additionally or alternatively use any other file identification information to identify the clean file that corresponds to the damaged file.

At step 306 in FIG. 3, one or more of the systems described herein may identify at least one file set that includes the clean file. For example, identification module 106 may identify, within file set database 122, one or more files sets that include the clean file that corresponds to damaged file 210. Identification module 106 may identify a file set that includes one or more files that are expected to be present on a computer when the clean file is present on the computer. Examples of such files sets include files that are part of a service pack for a software application, files that are included in a patch for a software application, and/or any other group of files. Identification module 106 may identify a file set that includes any number of files. The file set may include as few as two files, but may typically be much larger.

Identification module 106 may identify a file set that includes the clean file by searching file set database 122 for each file set that includes the clean file. For example, identification module 106 may search a file set database for file lists that include an identifier (e.g., a hash) of the clean file. In some embodiments, identification module 106 may identify a file set by using any other identifier of the clean file (e.g., a file name) and/or by identifying a file set that includes both a name and a hash of the clean file.

Once a file set that includes the clean file has been identified, evaluation module 108 may use the file set to evaluate the suitability of the clean file for use as a replacement for the damaged file. For example, at step 308 in FIG. 3, one or more of the systems described herein may determine whether the computing system includes an instance of each file in the file set. In some embodiments, evaluation module 108 may determine whether computing system 202 includes an instance of each file from the file set in file set database 122 that includes the clean file.

Evaluation module 108 may determine whether computing system 202 includes an instance of each file in the file set in any suitable manner. For example, evaluation module 108 may scan computing system 202 for files with the same names, hashes, and/or any other identification information as the files from the file set. In embodiments where multiple file sets were identified in step 306, evaluation module 108 may search for each file set on computing system 202.

Evaluation module 108 may determine whether computing system 202 includes an instance of each file in the file set in a variety of manners. For example, evaluation module 108 may perform a remote scan of computing system 202 to identify files on computing system 202 that have the same file name, hash, and/or other identifying characteristics as files in the file set. Alternatively, evaluation module 108 may include an agent on computing system 202 or may be located locally on computing system 202 and may perform a local scan of computing system 202 for files in the file set.

At step 310 in FIG. 3, one or more of the systems described herein may decide, based on the determination of whether the computing system includes an instance of each file in the file set, whether to replace the damaged file with the clean file. For example, evaluation module 108 may determine that computing system 202 includes an instance of each file in the file set. Evaluation module 108 may therefore decide to replace the damaged file 210 with the clean file and may perform the replacement operation. On the other hand, if evaluation module 108 does not find each file in the file set on computing system 202, evaluation module 108 may not replace damaged file 210 with the clean file.

By determining that files related to an infected file (i.e., in the same file set as the infected file) are located on a computing system with the infected file, embodiments of the instant disclosure may confirm that an infected file is being replaced by the correct version of a clean file. Embodiments of the instant disclosure may also insure that a user has a right to download the replacement file. If files related to a clean replacement file are not found on the computing system, systems described herein may search for other clean replacement files until finding a clean replacement file with related files that are located on the computing system.

Figure 4:
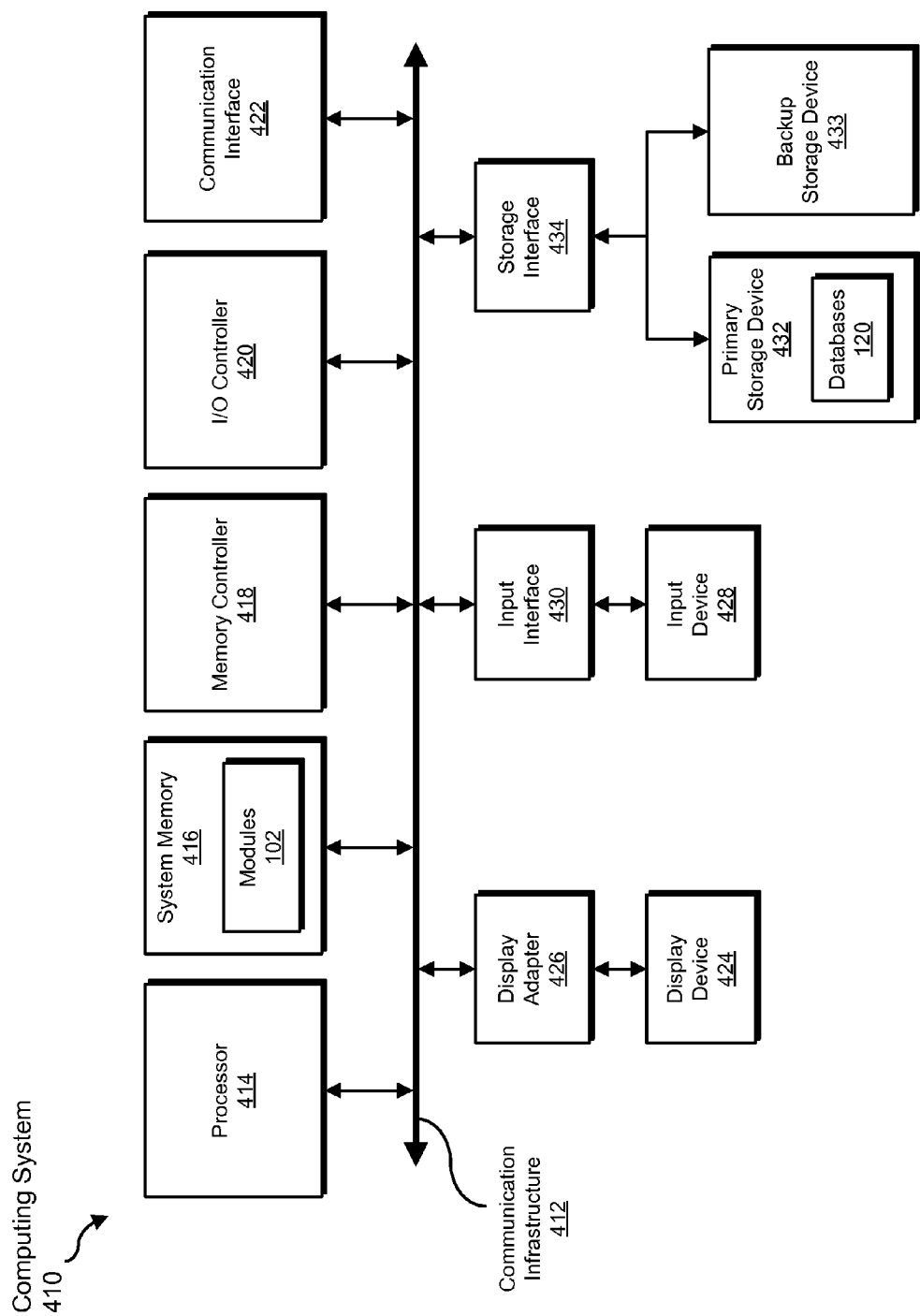
FIG. 4 is a block diagram of an exemplary computing system capable of implementing one or more of the embodiments described and/or illustrated herein.

FIG. 4 is a block diagram of an exemplary computing system 410 capable of implementing one or more of the embodiments described and/or illustrated herein. Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may include at least one processor 414 and a system memory 416.

Processor 414 generally represents any type or form of processing unit capable of processing data or interpreting and executing instructions. In certain embodiments, processor 414 may receive instructions from a software application or module. These instructions may cause processor 414 to perform the functions of one or more of the exemplary embodiments described and/or illustrated herein. For example, processor 414 may perform and/or be a means for performing, either alone or in combination with other elements, one or more of the receiving, identifying, evaluating, determining, deciding, matching, and replacing steps described herein. Processor 414 may also perform and/or be a means for performing any other steps, methods, or processes described and/or illustrated herein.

System memory 416 generally represents any type or form of volatile or non-volatile storage device or medium capable of storing data and/or other computer-readable instructions. Examples of system memory 416 include, without limitation, random access memory (RAM), read only memory (ROM), flash memory, or any other suitable memory device. Although not required, in certain embodiments computing system 410 may include both a volatile memory unit (such as, for example, system memory 416) and a non-volatile storage device (such as, for example, primary storage device 432, as described in detail below). In one example, one or more of modules 102 from FIG. 1 may be loaded into system memory 416.

In certain embodiments, exemplary computing system 410 may also include one or more components or elements in addition to processor 414 and system memory 416. For example, as illustrated in FIG. 4, computing system 410 may include a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an ISA, PCI, PCIe, or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412. In certain embodiments, memory controller may perform and/or be a means for performing, either alone or in combination with other elements, one or more of the steps or features described and/or illustrated herein, such as receiving, identifying, evaluating, determining, deciding, matching, and replacing.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434. I/O controller 420 may be used, for example, to perform and/or be a means for performing, either alone or in combination with other elements, one or more of the receiving, identifying, evaluating, determining, deciding, matching, and replacing steps described herein. I/O controller 420 may also be used to perform and/or be a means for performing other steps and features set forth in the instant disclosure.

Communication interface 422 broadly represents any type or form of communication device or adapter capable of facilitating communication between exemplary computing system 410 and one or more additional devices. For example, in certain embodiments communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution. In certain embodiments, communication interface 422 may perform and/or be a means for performing, either alone or in combination with other elements, one or more of the receiving, identifying, evaluating, determining, deciding, matching, and replacing steps disclosed herein. Communication interface 422 may also be used to perform and/or be a means for performing other steps and features set forth in the instant disclosure.

As illustrated in FIG. 4, computing system 410 may also include at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, exemplary computing system 410 may also include at least one input device 428 coupled to communication infrastructure 412 via an input interface 430. Input device 428 generally represents any type or form of input device capable of providing input, either computer or human generated, to exemplary computing system 410. Examples of input device 428 include, without limitation, a keyboard, a pointing device, a speech recognition device, or any other input device. In at least one embodiment, input device 428 may perform and/or be a means for performing, either alone or in combination with other elements, one or more of the receiving, identifying, evaluating, determining, deciding, matching, and replacing steps disclosed herein. Input device 428 may also be used to perform and/or be a means for performing other steps and features set forth in the instant disclosure.

As illustrated in FIG. 4, exemplary computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a floppy disk drive, a magnetic tape drive, an optical disk drive, a flash drive, or the like. Storage interface 434 generally represents any type or form of interface or device for transferring data between storage devices 432 and 433 and other components of computing system 410. In one example, databases 120 from FIG. 1 may be stored in primary storage device 432.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

In certain embodiments, storage devices 432 and 433 may be used, for example, to perform and/or be a means for performing, either alone or in combination with other elements, one or more of the receiving, identifying, evaluating, determining, deciding, matching, and replacing steps disclosed herein. Storage devices 432 and 433 may also be used to perform and/or be a means for performing other steps and features set forth in the instant disclosure.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4. Computing system 410 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 410 may be configured as an application specific integrated circuit (ASIC) adapted to implement one or more of the exemplary embodiments disclosed herein.

Figure 5:
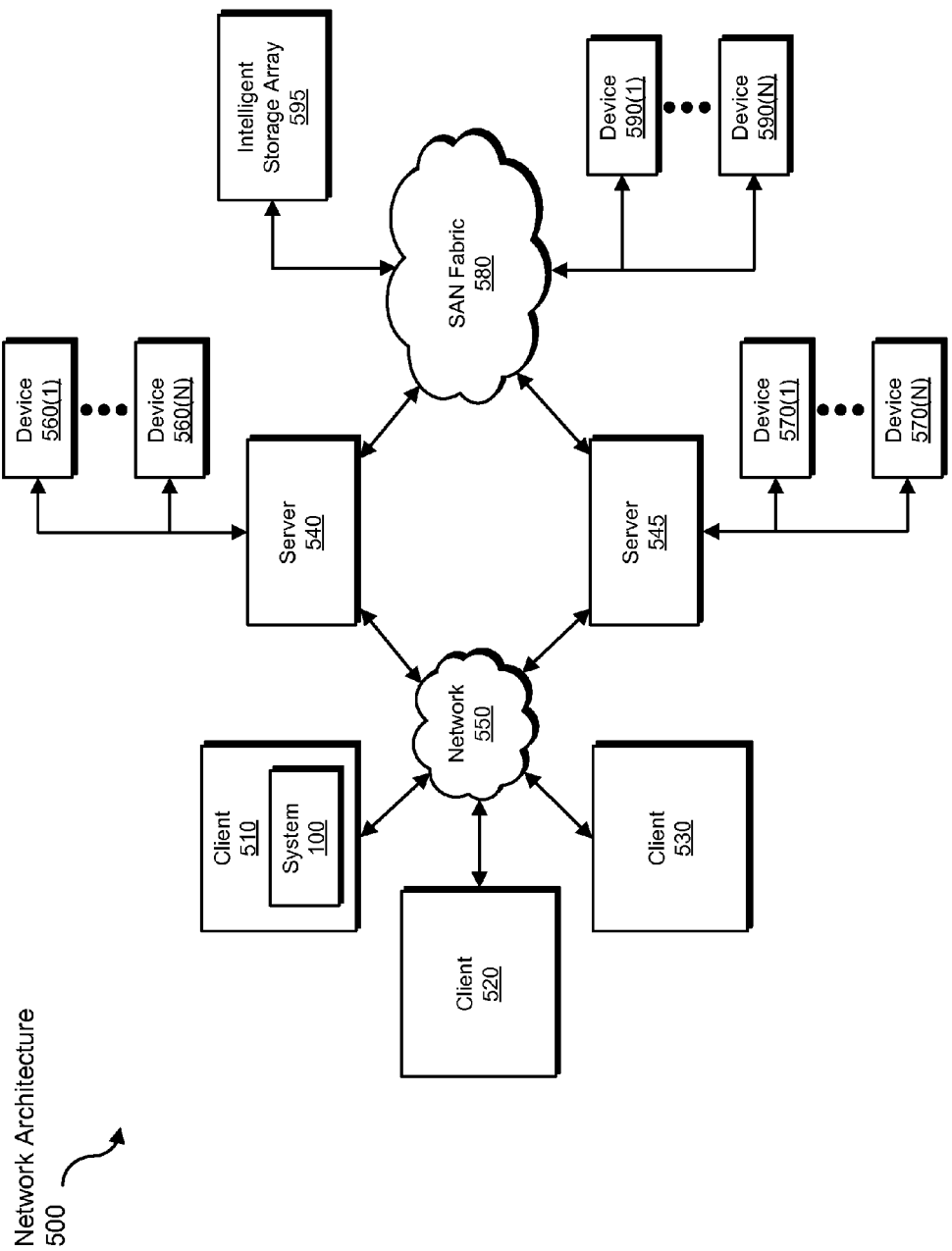
FIG. 5 is a block diagram of an exemplary computing network capable of implementing one or more of the embodiments described and/or illustrated herein.

FIG. 5 is a block diagram of an exemplary network architecture 500 in which client systems 510, 520, and 530 and servers 540 and 545 may be coupled to a network 550. Client systems 510, 520, and 530 generally represent any type or form of computing device or system, such as exemplary computing system 410 in FIG. 4. In one example, client system 510 may include system 100 from FIG. 1.

Similarly, servers 540 and 545 generally represent computing devices or systems, such as application servers or database servers, configured to provide various database services and/or run certain software applications. Network 550 generally represents any telecommunication or computer network including, for example, an intranet, a wide area network (WAN), a local area network (LAN), a personal area network (PAN), or the Internet.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent network-attached storage (NAS) devices configured to communicate with servers 540 and 545 using various protocols, such as NFS, SMB, or CIFS.

Servers 540 and 545 may also be connected to a storage area network (SAN) fabric 580. SAN fabric 580 generally represents any type or form of computer network or architecture capable of facilitating communication between a plurality of storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to exemplary computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590(1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the exemplary embodiments disclosed herein may also be encoded as a computer program, stored in server 540, run by server 545, and distributed to client systems 510, 520, and 530 over network 550. Accordingly, network architecture 500 may perform and/or be a means for performing, either alone or in combination with other elements, one or more of the receiving, identifying, evaluating, determining, deciding, matching, and replacing steps disclosed herein. Network architecture 500 may also be used to perform and/or be a means for performing other steps and features set forth in the instant disclosure.

As detailed above, computing system 410 and/or one or more components of network architecture 500 may perform and/or be a means for performing, either alone or in combination with other elements, one or more steps of an exemplary method for contextual evaluation of files for use in file restoration.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform an infected computing system into a clean computing system by replace an infected file on the computing system with a clean instance of the infected file.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for contextual evaluation of files for use in file restoration, at least a portion of the method being performed by a computing device comprising at least one processor, the method comprising:
   receiving a request to replace a damaged file on a computing system with a clean instance of the damaged file;
   identifying a clean file that corresponds to the damaged file;
   identifying, in a file set database, at least one file set that includes the clean file, the file set including one or more additional files that are expected to be present on a computer when the clean file is present on the computer;
   evaluating the suitability of the clean file for use as a replacement for the damaged file by:
      determining whether the computing system includes an instance of each file in the file set from the file set database; and
      deciding, based on the determination of whether the computing system includes an instance of each file in the file set, whether to replace the damaged file with the clean file.

2. The method of claim 1, wherein:
   identifying the clean file that corresponds to the damaged file comprises matching a hash of the clean file to a hash of the damaged file; and
   determining whether the computing system includes an instance of each file in the file set comprises determining whether a hash of each file in the file set matches a hash of a file on the computing system.

3. The method of claim 1, wherein:
   the file set comprises the clean file and a plurality of additional files;
   determining whether the computing system includes an instance of each file in the file set comprises determining that the computing system includes an instance of each file in the file set;
   determining whether to replace the damaged file with the clean file comprises:
      determining to replace the damaged file with the clean file; and
      replacing the damaged file with the clean file.

4. The method of claim 1, wherein:
   determining whether the computing system includes an instance of each file in the file set comprises determining that the computing system does not include an instance of each file in the file set; and
   determining whether to replace the damaged file with the clean file comprises determining not to replace the damaged file with the clean file.

5. The method of claim 1, further comprising:
   determining whether the computing system has access rights to the damaged file, wherein determining whether the computing system has access rights to the damaged file comprises determining whether the computing system includes an instance of each file in the file set.

6. The method of claim 1, further comprising:
   determining whether the clean file comprises a correct file version for replacing the damaged file, wherein determining whether the clean file comprises the correct file version for replacing the damaged file comprises determining whether the computing system includes an instance of each file in the file set.

7. The method of claim 1, further comprising:
   receiving the file set from a publisher of the damaged file.

8. The method of claim 1, wherein:
   the file set comprises a set of hashes and corresponding file names that identify a set of files.

9. The method of claim 1, wherein the file set comprises at least one of:
   a set of files included in a service pack for a software application; and
   a set of files included in a patch for a software application.

10. The method of claim 1, wherein the damaged file comprises:
    a file infected with malware.

11. A system for contextual evaluation of files for use in file restoration, the system comprising:
    a communication module programmed to receive a request to replace a damaged file on a computing system with a clean instance of the damaged file;
    an identification module programmed to:
       identify a clean file that corresponds to the damaged file;
       identify, in a file set database, at least one file set that includes the clean file, the file set including one or more additional files that are expected to be present on a computer when the clean file is present on the computer;
    an evaluation module programmed to evaluate the suitability of the clean file for use as a replacement for the damaged file by:
       determining whether the computing system includes an instance of each file in the file set from the file set database; and
       deciding, based on the determination of whether the computing system includes an instance of each file in the file set, whether to replace the damaged file with the clean file;
    one or more processors configured to execute the communication module, the identification module, and the evaluation module.

12. The system of claim 11, wherein:
    the identification module is programmed to identify the clean file that corresponds to the damaged file by matching a hash of the clean file to a hash of the damaged file; and
    the evaluation module is programmed to determine whether the computing system includes an instance of each file in the file set by determining whether a hash of each file in the file set matches a hash of a file on the computing system.

13. The system of claim 11, wherein:
    the evaluation module is programmed to determine whether the computing system includes an instance of each file in the file set by determining that the computing system includes an instance of each file in the file set; and
    the evaluation module is programmed to determine whether to replace the damaged file with the clean file by:
       determining to replace the damaged file with the clean file; and
       replacing the damaged file with the clean file.

14. The system of claim 11, wherein:
    the evaluation module is programmed to determine whether the computing system includes an instance of each file in the file set by determining that the computing system does not include an instance of each file in the file set; and the evaluation module is programmed to determine whether to replace the damaged file with the clean file by determining not to replace the damaged file with the clean file.

15. The system of claim 11, wherein:

the evaluation module is programmed to determine whether the computing system has access rights to the damaged file by determining whether the computing system includes an instance of each file in the file set.

16. The system of claim 11, wherein:

the evaluation module is programmed to determine whether the clean file comprises a correct file version for replacing the damaged file by determining whether the computing system includes an instance of each file in the file set.

17. The system of claim 11, wherein:

the communication module is programmed to receive the file set from a publisher of the damaged file.

18. The system of claim 11, wherein:

the file set comprises a set of hashes and corresponding file names that identify a set of files.

19. The system of claim 11, wherein the file set comprises at least one of:

a set of files included in a service pack for a software application; and a set of files included in a patch for a software application.

20. A non-transitory computer-readable-storage medium comprising one or more computer-executable instructions that, when executed by at least one processor of a computing device, cause the computing device to:

receive a request to replace a damaged file on a computing system with a clean instance of the damaged file;

identify a clean file that corresponds to the damaged file;

identify, in a file set database, at least one file set that includes the clean file, the file set including one or more additional files that are expected to be present on a computer when the clean file is present on the computer;

evaluate the suitability of the clean file for use as a replacement for the damaged file by:

determining whether the computing system includes an instance of each file in the file set from the file set database; and deciding, based on the determination of whether the computing system includes an instance of each file in the file set, whether to replace the damaged file with the clean file.

\* \* \* \* \*